T. E. & O. C. McDOWELL.
HAY AND SHOCK LOADER.
APPLICATION FILED NOV. 19, 1908.
930,556.
Patented Aug. 10, 1909.
3 SHEETS—SHEET 2.
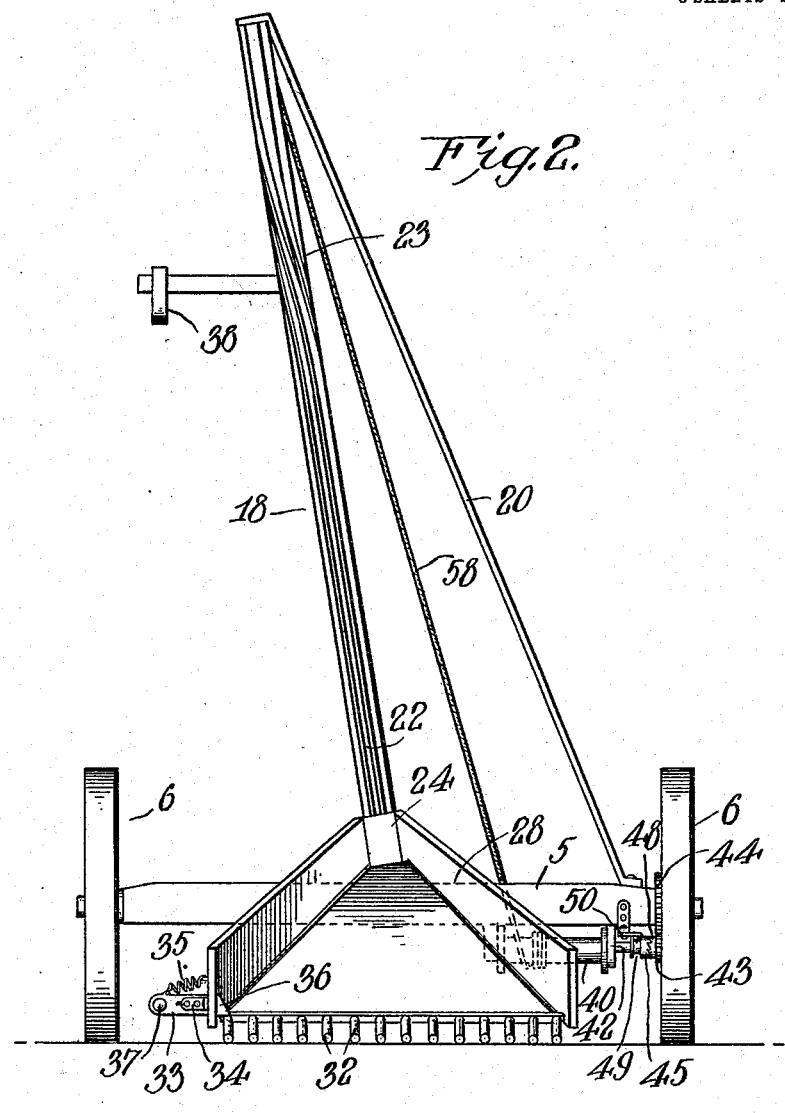
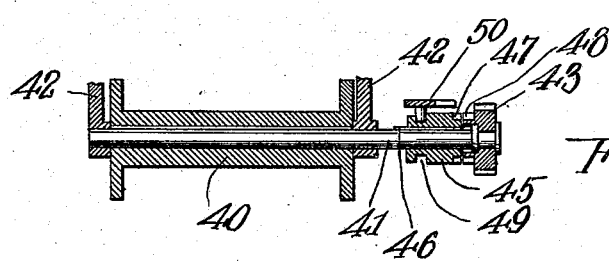
WITNESSES:
C. E. Smith.
L. L. Durket.
INVENTORS
Thomas E. McDowell and
Okie C. McDowell,
BY Wm Bagger & Co.
Attorneys

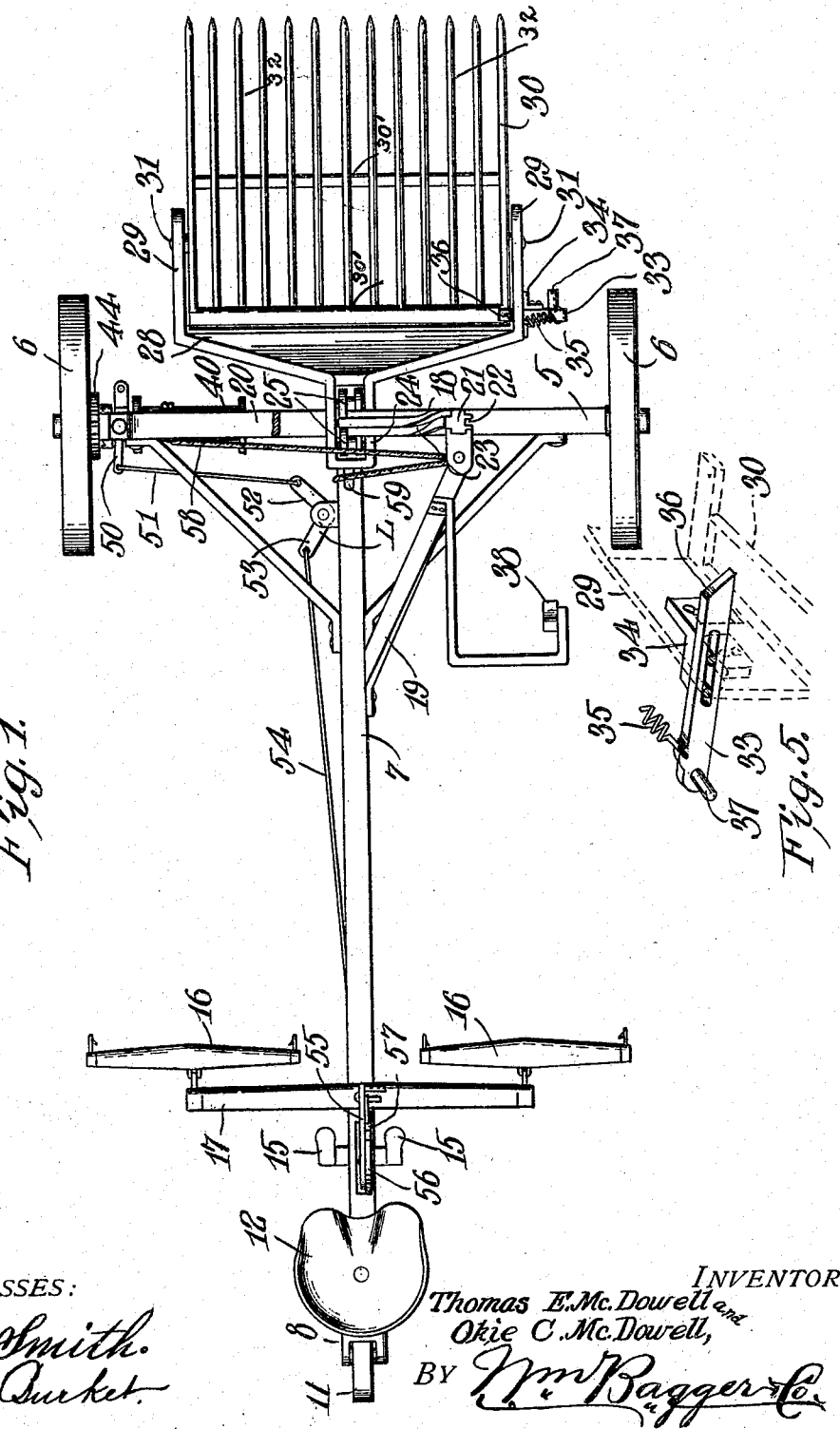

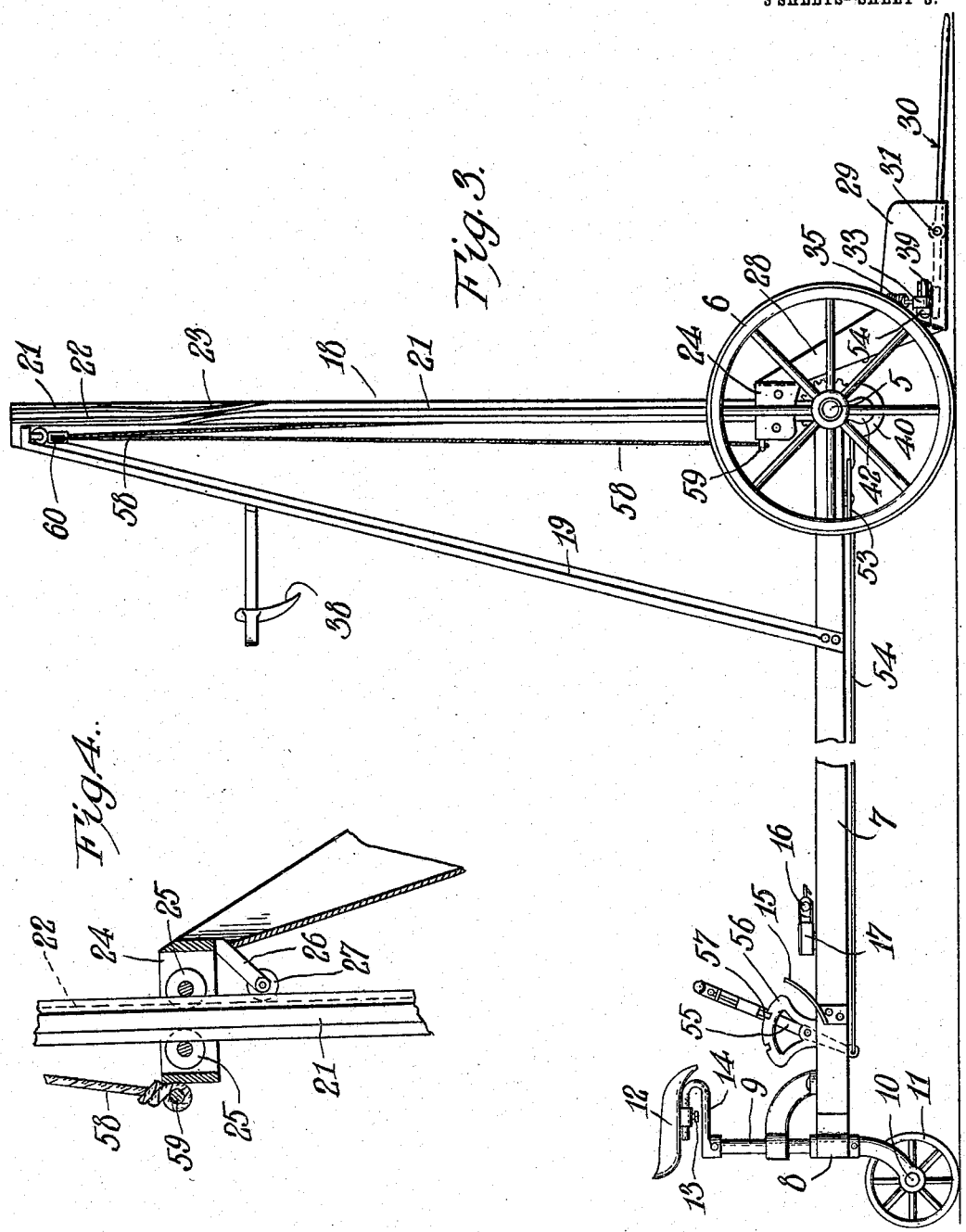

UNITED STATES PATENT OFFICE.

THOMAS E. McDOWELL AND OKIE C. McDOWELL, OF GOTHENBURG, NEBRASKA.

HAY AND SHOCK LOADER.

No. 930,556.     Specification of Letters Patent.     Patented Aug. 10, 1909.

Application filed November 19, 1908. Serial No. 463,442.

*To all whom it may concern:*

Be it known that we, THOMAS E. McDOWELL and OKIE C. McDOWELL, citizens of the United States, residing at Gothenburg, in the county of Dawson and State of Nebraska, have invented certain new and useful Improvements in Hay and Shock Loaders, of which the following is a specification.

This invention relates to hoisting and loading apparatus, and it has for its object to provide a machine or device of simple and improved construction for hoisting or elevating hay, grain and the like to enable the same to be deposited in a wagon-box, upon a hay or grain rack or upon a vehicle of any kind for further transportation.

A further object of the invention is to provide a machine of the class described, which will serve to pick up the shocks or bundles of grain, cocks or bundles of hay or other like material in the field and elevate the same preparatory to dumping it upon a vehicle for transportation.

Further objects of the invention are to simplify and improve the construction and operation of this class of devices.

With these and other ends in view which will readily appear as the nature of the invention is better understood, the same consists in the improved construction and novel arrangement and combination of parts, which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings—Figure 1 is a top plan view of a machine constructed in accordance with the invention. Fig. 2 is a front elevation of the same. Fig. 3 is a side elevation. Fig. 4 is a sectional detail view, enlarged, showing a carriage which constitutes a part of the device, and a portion of the mast or upright supporting the same. Fig. 5 is a perspective detail view illustrating a portion of the carriage and of the fork or platform connected therewith. Fig. 6 is a sectional detail view illustrating a portion of the hoisting mechanism.

Corresponding parts in the several figures are denoted by like characters of reference.

The improved machine is equipped with an axle 5, having transporting wheels 6, 6. A reach 7 is securely connected with the axle from which it extends in a rearward direction, said reach being provided at or near its rear end with a bearing 8 for an approximately vertical spindle 9, the lower end of which is bifurcated to afford bearings for a shaft 10 carrying a caster wheel 11, which supports the rear end of the reach. A seat 12 for the driver or operator is adjustably supported by means of a setscrew 13 upon a supporting spring 14, which is suitably and securely mounted upon the upper end of the spindle 9. A suitable foot-rest 15, is supported upon the reach in front of the said supporting spindle to enable the driver to steady himself and to exert the force needed to oscillate the spindle 9 in its bearing for the purpose of adjusting the caster-wheel to guide the machine when in motion.

The machine may be propelled by horses or other draft animals hitched to whiffletrees 16, mounted at the ends of a doubletree 17, which is supported upon the reach a suitable distance in advance of the driver's seat, as shown.

The axle 5, supports about midway between its ends a mast or upright 18, which is tilted laterally to one side, as will be clearly seen in Figs. 1 and 2 of the drawings; the mast or upright 18 is supported and reinforced by guys or braces 19 and 20, connecting the upper end of said upright respectively, with the reach 7 and with the axle 5. The mast or upright is provided upon the sides thereof with rails or flanges 21, constituting a track for the wheels or rollers of the carriage, which will be presently more fully described, and the front side or face of the mast has a groove 22, the function of which will be presently set forth. Near its upper end the mast or upright is twisted to form a spiral 23, the extent of said spiral twist being approximately ninety degrees; as a result of this spiral twist the upper end of the groove 22 will terminate at one side, that is to say, facing one of the supporting wheels 6 of the machine; and it will be further observed that the spiral twist is formed in the direction in which the mast or upright is tilted, and it will thus be seen that the upper terminal of the groove 22 will be formed in the side of the mast or upright which is inclined downwardly.

The mast or upright supports a traveling jack or carriage equipped with pairs of wheels or rollers 25, engaging and traveling upon the rails or flanges 21; said wheels or rollers being so arranged as to support the jack or carriage in such a manner that it will be maintained in position without danger of tilting or canting to either side. The frame 24, has a downward extending bracket 26, carrying a guide roller 27, which operates in the groove 22 and which serves not only to steady the movement of the jack or carriage, but also to assist in guiding the latter, especially upon the spirally twisted portion of the track.

It will be readily seen that when the carriage moves in an upward direction upon the mast or upright it will, as it approaches the upper extremity of said upright, be swung in an approximately horizontal plane to an extent which coincides with the spiral twist of the track, the same being, as hereinbefore stated, approximately ninety degrees or one fourth of a revolution; it will be further understood that the front side of the jack or carriage will swing in a direction which will place it adjacent to the downwardly inclined side of the mast or upright.

The frame of the jack or carriage is provided with downward extending divergent arms 28, having forwardly extending terminal brackets 29, between which a rack or gathering platform 30 is pivotally supported, as by means of a transverse shaft or pivots 31; said rack or gathering platform is composed of a plurality of teeth 32 suitably connected with each other as by cross-bars 30' and with the pivots 31. The platform 30 is supported in an approximately horizontal position for gathering the load and for supporting the same while it is being hoisted or elevated, by means of a latch member 33, that is slidably supported by means of lugs or ears 34, upon one of the brackets 29 of the jack or carriage, and actuated by means of a suitable spring 35, whereby said latch member is normally projected above the rear portion of the platform 30; the inner extremity of the latch member 33 being beveled, as shown at 36, to enable it to be easily and automatically engaged by the platform. The latch member 33 is provided near its outer extremity with a laterally projecting pin 37 adapted to be engaged, at the proper time, by a hook 38, which may be suitably supported upon the brace or guy-member 19, as shown, for the purpose of releasing the platform to permit the latter to tilt and to dump the load.

The hoisting mechanism of the improved machine includes a winding drum 40, which is mounted upon a shaft 41 supported for rotation in brackets 42 depending from the axle 5. The shaft 41 carries a loose pinion 43 meshing with the spur wheel 44, which is suitably secured upon and connected with one of the transporting wheels 6; the shaft 41 carries a sleeve or collar 45, which is longitudinally slidable upon said shaft and is connected therewith for rotation by means of a spline or feather 46; the sleeve 45 is provided at one end with a clutch member 47, adapted to engage a corresponding clutch member 48, upon the pinion 43; said sleeve 45 is also provided with an annular groove 49, engaged by a suitably supported shipping lever 50, the free end of which is connected by a link 51, with one arm 52, of a bell-crank lever L, the other arm of which 53 is connected by a link or rod 54 with an operating lever 55, which is pivotally supported, in convenient proximity, on the driver's seat by means of a stand or bracket 56, including a segment rack which is adapted to be engaged by a latch-member 57, connected with the lever 55 for the purpose of maintaining said lever and the parts actuated thereby in adjusted position.

Suitably connected with or attached to the winding drum 40, is one end of the flexible hoisting element, such as a rope or cable 58, the other end of which is connected with the jack or carriage, the frame of which 24 may be provided with a lug or ear 59 for convenience of attachment of said hoisting element; the latter being guided over a block or pulley 60, which is suitably supported adjacent to the upper extremity of the mast or upright.

From the foregoing description taken in connection with the drawings hereto annexed, the operation and advantages of this invention will be readily understood by those skilled in the art to which it appertains.

The machine may be readily propelled over the field, and guided in such a manner that shocks of grain, cocks or bundles of hay and the like will be picked up by the rake or platform which is supported in approximately horizontal position in proximity to the ground the jack or carriage being meanwhile positioned near the lower extremity of the mast or upright. When a load has accumulated, the operator manipulates the lever 55 to place the clutch members 47, 48, in engagement with each other, and as the machine progresses, rotary motion will thus be transmitted from one of the transporting wheels to the shaft carrying the winding drum 40, and the flexible hoisting element will be wound upon the latter, thus causing the jack or carriage to travel upwardly upon the mast or upright. When the carriage approaches the upper extremity of the upright, a spiral twist of the latter will operate to swing the carriage with its load, in an approximately horizontal plane, thus shifting the load from the front to one side of the mast or upright, being the side which is tilted or inclined downwardly. As the carriage swings around, the laterally extending pin 37 of the latch member 36, is engaged by the hook 38, and the latch-member is thereby withdrawn, against the tension of the spring 35, thus releasing the platform and permitting the latter to tilt under the impulse of the weight of the load supported thereon, thus dumping the load to one side of the machine and into a receptacle, such as the box of a wagon or vehicle which is driven along side of the machine. After the load has been dumped, the lever 55 is actuated to disengage the clutch mechanism, thus permitting the winding drum to rotate freely and permitting the jack or carriage to descend by gravity. When the carriage reaches the lower limit of its movement, the points of the teeth of the platform will contact with the ground, and the platform will thus be restored to its normal approximately horizontal position where it is engaged and retained by the beveled catch 33; if necessary, however, the platform may be restored manually in order to avoid danger of injury to the teeth thereof.

The improved machine is simple in construction, and it will be found capable of handling and elevating heavy loads—thus enabling hay and grain to be loaded upon vehicles for transportation with a very considerable saving of labor and expense. Owing to the tilted position of the mast or upright, the load that is elevated by the machine will be discharged to one side without liability of missing the receptacle into which it is to be dumped. The spiral twist of the mast or upright serves to impart to the jack or carriage the partial rotation which is necessary to shift the load from the front to one side of the mast or upright.

Having thus described the invention, what is claimed is:

1. In a hoisting and loading machine, a wheel supported axle, a mast or upright supported upon the axle and tilted in the direction of one of the wheels, and a carriage traveling upon said mast or upright.

2. In a hoisting and loading machine of the character described, a wheel supported axle, an upright mounted upon the axle and having a spirally twisted portion, and a carriage guided upon the upright.

3. In a hoisting and loading machine of the character described, a wheel supported axle, an upright supported in an inclined position upon the axle and having a spirally twisted portion, and a carriage guided upon the upright.

4. In a hoisting and loading machine of the character described, a wheel supported axle, an upright supported in an inclined position upon the axle and having flanges constituting guiding tracks and a spirally twisted portion, and a carriage guided upon the upright.

5. A wheel supported axle, an inclined upright mounted upon the axle, tilted in the direction of one of the wheels and having guide flanges and a guiding groove, and a carriage traveling upon the upright and having wheels engaging the flanges and the groove.

6. In a machine of the character described, an inclined mast or upright having flanges upon the sides thereof and a groove in its front face, intermediate the flanges, a portion of said upright being spirally twisted, and a carriage traveling upon the upright and having wheels engaging the groove and flanges.

7. In a machine of the character described, an inclined spirally twisted upright having guide members, a carriage guided upon said upright and having arms provided with terminal brackets, a gathering platform supported pivotally between the brackets, and spring-actuated means for maintaining the platform normally in approximately horizontal position.

8. In a machine of the character described, an inclined upright having a spirally twisted portion and equipped with rails or flanges, a carriage guided upon the upright, a gathering platform tiltingly supported by the carriage, a spring actuated latch for maintaining the platform normally in an approximately horizontal position, and means disposed in the path of the latch to disengage the latter and release the platform when the carriage approaches the limit of its movement over the spiral twisted portion of the upright.

9. In a machine of the character described, an inclined upright having guide members and a spirally twisted portion, guys or braces supporting said upright, a carriage guided upon the latter and having a tilting platform, a latch member engaging and supporting said platform, and a latch engaging hook supported upon one of the guys in the path of the latch to actuate the latter and release the platform.

10. In a machine of the character described, a wheel supported axle, having a rearward extending reach, a spindle supported adjacent to the rear end of the reach and having a caster wheel at its lower end, a seat supported upon the upper end of the spindle, a draft attachment connected with the reach in advance of the spindle, and an inclined upright supported upon the axle and having guide-members and a spirally twisted portion, a carriage guided upon the upright and having a tilting platform and a latch-member supporting said platform, means supported in the path of the latch member to disengage the latter and release the platform, a winding drum, a suitably guided flexible element connecting the winding drum with the carriage, and means including a clutch mechanism for transmitting motion to the winding drum from one of the transporting wheels upon the axle.

In testimony whereof we affix our signatures in presence of two witnesses.

THOMAS E. McDOWELL.
OKIE C. McDOWELL.

Witnesses:
E. J. LOUTZENHEISER,
MARTHA VOSS.